United States Patent
Baird et al.

(10) Patent No.: US 9,523,042 B2
(45) Date of Patent: Dec. 20, 2016

(54) METHODS AND FUEL PROCESSING APPARATUSES FOR UPGRADING A PYROLYSIS OIL STREAM AND A HYDROCARBON STREAM

(75) Inventors: Lance Awender Baird, Prospect Heights, IL (US); Paolo Palmas, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 838 days.

(21) Appl. No.: 13/563,011

(22) Filed: Jul. 31, 2012

(65) Prior Publication Data
US 2014/0034552 A1 Feb. 6, 2014

(51) Int. Cl.
*C10G 11/18* (2006.01)
*C10G 51/04* (2006.01)
*B01J 4/00* (2006.01)

(52) U.S. Cl.
CPC ............. *C10G 11/18* (2013.01); *B01J 4/002* (2013.01); *C10G 11/187* (2013.01); *C10G 51/04* (2013.01); *B01J 2204/002* (2013.01); *B01J 2204/007* (2013.01); *C10G 2300/1011* (2013.01); *C10G 2300/1074* (2013.01); *C10G 2300/4006* (2013.01)

(58) Field of Classification Search
CPC ..... C10G 11/18; C10G 11/182; C10G 11/187; C10G 51/04
See application file for complete search history.

(56) References Cited

U.S. PATENT DOCUMENTS

| | | | |
|---|---|---|---|
| 6,627,161 B1 | 9/2003 | Radcliffe et al. | |
| 6,936,227 B1 * | 8/2005 | De Souza et al. | 422/140 |
| 2010/0083566 A1 * | 4/2010 | Fredriksen et al. | 44/354 |
| 2010/0222620 A1 | 9/2010 | O'Connor et al. | |
| 2012/0160741 A1 * | 6/2012 | Gong et al. | 208/113 |
| 2012/0216448 A1 * | 8/2012 | Ramirez Corredores et al. | 44/307 |

FOREIGN PATENT DOCUMENTS

WO WO 2011/053166 * 5/2011 ............ C10G 1/00

* cited by examiner

*Primary Examiner* — Renee E Robinson

(57) ABSTRACT

Methods and fuel processing apparatuses for upgrading a pyrolysis oil stream and a hydrocarbon stream are provided herein. In an embodiment, a method for upgrading a pyrolysis oil stream and a hydrocarbon stream includes providing a pyrolysis oil stream and providing a hydrocarbon stream separate from the pyrolysis oil stream. The pyrolysis oil stream and the hydrocarbon stream are mixed in a mixing zone and in the absence of a particulate cracking catalyst. The pyrolysis oil stream and the hydrocarbon stream are introduced in a substantially common direction into the mixing zone to form a mixture of the pyrolysis oil stream and the hydrocarbon stream. The mixture of the pyrolysis oil stream and the hydrocarbon stream are catalytically cracked in the presence of the particulate cracking catalyst.

16 Claims, 2 Drawing Sheets

METHODS AND FUEL PROCESSING APPARATUSES FOR UPGRADING A PYROLYSIS OIL STREAM AND A HYDROCARBON STREAM

TECHNICAL FIELD

The technical field generally relates to methods and fuel processing apparatuses for upgrading a pyrolysis oil stream and a hydrocarbon stream. More particularly, the technical field relates to methods and fuel processing apparatuses for catalytically cracking a mixture of a pyrolysis oil stream and a hydrocarbon stream.

BACKGROUND

Fluid catalytic cracking (FCC) is a well-known process for the conversion of relatively high boiling point hydrocarbons to lower boiling point hydrocarbons in the heating oil or gasoline (or lighter) range. Such processes are commonly referred to in the art as "upgrading" processes. To conduct FCC processes, FCC units are generally provided that have one or more reaction chambers, with a hydrocarbon stream contacted in the one or more reaction chambers with a particulate cracking catalyst. The particulate cracking catalyst is maintained in a fluidized state under conditions that are suitable for the conversion of the relatively high boiling point hydrocarbons to lower boiling point hydrocarbons.

While hydrocarbon streams such as vacuum gas oil, reduced crude, or other petroleum-based sources of hydrocarbons have commonly been upgraded through FCC processes, there is a general desire to upgrade biofuels along with the hydrocarbon streams in the FCC processes. By upgrading biofuel along with the hydrocarbon streams, the resulting upgraded fuel includes a renewable content and enables net petroleum-based hydrocarbon content of the upgraded fuel to be decreased.

Biofuels encompass various types of combustible fuels that are derived from organic biomass, and one particular type of biofuel is pyrolysis oil, which is also commonly referred to as biomass-derived pyrolysis oil. Pyrolysis oil is produced through pyrolysis, including through recently-developed fast pyrolysis processes. Fast pyrolysis is a process during which organic biomass, such as wood waste, agricultural waste, etc., is rapidly heated to about 450° C. to about 600° C. in the absence of air using a pyrolysis unit. Under these conditions, a pyrolysis vapor stream including organic vapors, water vapor, and pyrolysis gases is produced, along with char (which includes ash and combustible hydrocarbon solids). A portion of the pyrolysis vapor stream is condensed in a condensing system to produce a pyrolysis oil stream. Pyrolysis oil is a complex, highly oxygenated organic liquid that typically contains about 20-30% by weight water with high acidity (TAN>150).

Due to the high oxygen content of the pyrolysis oils, pyrolysis oils are generally immiscible with hydrocarbon streams. Prior attempts to co-process pyrolysis oil streams and hydrocarbon streams have involved deoxygenation of the pyrolysis oil followed by combining the deoxygenated pyrolysis oil stream and hydrocarbon stream prior to FCC processing. Such approaches add unit operations, along with added capital costs, to the upgrading process. Further, clogging of feed lines may still remain a concern even after deoxygenating the pyrolysis oils, and feed lines that facilitate introduction of a pyrolysis oil stream into a reaction zone where FCC processing is conducted are prone to clogging. Additionally, feed lines that contain mixtures of a hydrocarbon stream and a pyrolysis oil stream are also generally prone to clogging due to the presence of the pyrolysis oil stream in the feed lines.

Accordingly, it is desirable to provide methods and apparatuses that enable a mixture of a pyrolysis oil stream and a hydrocarbon stream to be upgraded through catalytic cracking, such as in fluid catalytic cracking units, while avoiding excessive clogging of feed lines. Furthermore, other desirable features and characteristics of the present invention will become apparent from the subsequent detailed description of the invention and the appended claims, taken in conjunction with the accompanying drawings and this background of the invention.

BRIEF SUMMARY

Methods of and fuel processing apparatuses for upgrading a pyrolysis oil stream and a hydrocarbon stream are provided herein. In an embodiment, a method for upgrading a pyrolysis oil stream and a hydrocarbon stream includes providing a pyrolysis oil stream and providing a hydrocarbon stream separate from the pyrolysis oil stream. The pyrolysis oil stream and the hydrocarbon stream are mixed in a mixing zone and in the absence of a particulate cracking catalyst. The pyrolysis oil stream and the hydrocarbon stream are introduced in a substantially common direction into the mixing zone to form a mixture of the pyrolysis oil stream and the hydrocarbon stream. The mixture of the pyrolysis oil stream and the hydrocarbon stream are catalytically cracked in the presence of the particulate cracking catalyst.

In another embodiment, a method for upgrading a pyrolysis oil stream and a hydrocarbon stream is conducted in a fluid catalytic cracking unit. The fluid catalytic cracking unit includes a reaction chamber and a feed distributor that is in fluid communication with the reaction chamber. The method includes providing the hydrocarbon stream separate from the pyrolysis oil stream to the feed distributor. The feed distributor includes a pyrolysis oil feed line and a hydrocarbon feed line that have respective outlets into a mixing zone for separately supporting flow of the hydrocarbon stream and the pyrolysis oil stream into the mixing zone. The pyrolysis oil feed line and the hydrocarbon feed line extend in a substantially common direction to the respective outlets. The hydrocarbon stream and the pyrolysis oil stream are mixed in the mixing zone and in the absence of a particulate cracking catalyst to form a mixture of the pyrolysis oil stream and the hydrocarbon stream. The mixture of the pyrolysis oil stream and the hydrocarbon stream are introduced into a reaction zone within the reaction chamber, and the mixture of the pyrolysis oil stream and the hydrocarbon stream are catalytically cracked in the presence of the particulate cracking catalyst in the reaction zone within the reaction chamber.

In another embodiment, a fuel processing apparatus includes a pyrolysis unit for pyrolyzing a biomass stream to produce a pyrolysis oil stream. The fluid processing apparatus further includes a fluid catalytic cracking unit, and the fluid catalytic cracking unit includes a reaction chamber and a feed distributor. The reaction chamber has a reaction zone within which particulate cracking catalyst is contacted with a mixture of a hydrocarbon stream and the pyrolysis oil stream. The feed distributor is adapted to receive the pyrolysis oil stream and the hydrocarbon stream. The feed distributor includes a pyrolysis oil feed line and a hydrocarbon feed line that have respective outlets into a mixing zone for separately supporting flow of the hydrocarbon stream and the pyrolysis oil stream into the mixing zone. The pyrolysis oil feed line and the hydrocarbon feed line extend in a substantially common direction to the respective outlets.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
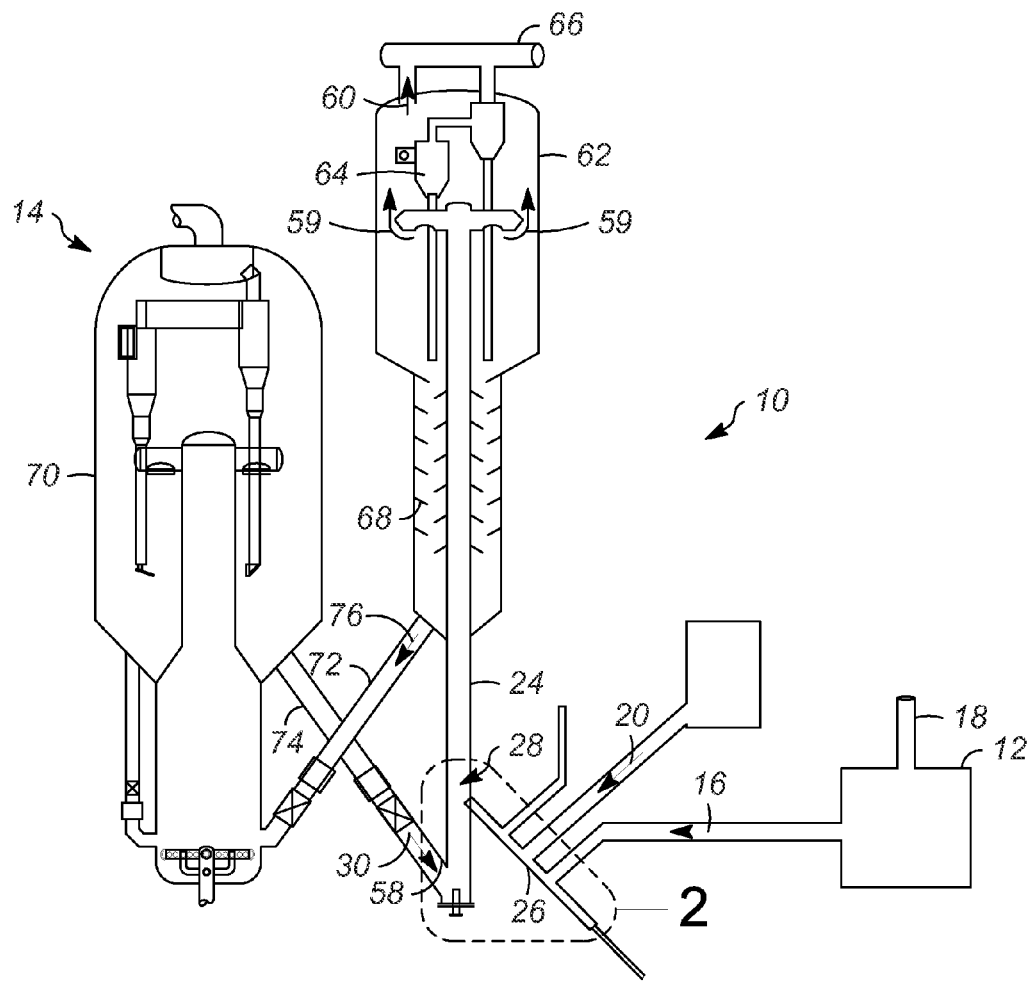
FIG. 1 is a schematic diagram of a fuel processing apparatus and a method for preparing upgraded pyrolysis oil in accordance with an exemplary embodiment.

The following detailed description is merely exemplary in nature and is not intended to limit the invention or the application and uses of the invention. Furthermore, there is no intention to be bound by any theory presented in the preceding background or the following detailed description.

Methods and fuel processing apparatuses for upgrading a pyrolysis oil stream and a hydrocarbon stream are provided herein. As referred to herein, "upgrading" refers to conversion of relatively high boiling point hydrocarbons to lower boiling point hydrocarbons. Upgrading processes generally render a hydrocarbon stream and a pyrolysis oil stream suitable for use as a transportation fuel. In the methods and fuel processing apparatuses described herein, a mixture of the pyrolysis oil stream and the hydrocarbon stream are catalytically cracked in a reaction zone in the presence of a particulate cracking catalyst. The reaction zone, as referred to herein, is an area or space where particulate cracking catalyst is comingled along with the pyrolysis oil stream and/or the hydrocarbon stream. Catalytic cracking is conducted at temperatures in excess of 100° C., and the hydrocarbon stream is generally provided at temperatures in excess of 100° C. However, pyrolysis oil generally polymerizes at temperatures in excess of about 100° C. and forms deposits within the apparatuses. Deposit formation is less of a concern in the reaction zone than in feed lines that lead to the reaction zone. In particular, deposit formation in the reaction zone generally results in deposited compounds forming on the particulate cracking catalyst. Because the particulate cracking catalyst may be regenerated through conventional processes even with high amounts of deposited compounds present thereon, operation of the fuel processing apparatuses is not materially affected by formation of deposited compounds on the particulate cracking catalyst. However, deposit formation in the feed lines that lead to the reaction zone may result in clogging, which requires shutdown of the fuel processing apparatuses and cleanout of the clogged feed lines. Therefore, to minimize deposit formation attributable to polymerization within the pyrolysis oil stream in the feed lines that lead to the reaction zone, the methods and fuel processing apparatuses that are described herein are adapted to minimize temperature rise of the pyrolysis oil stream until the pyrolysis oil stream is clear of structure upon which deposit formation could cause clogging.

To minimize the temperature rise of the pyrolysis oil stream in accordance with the methods and fuel processing apparatuses described herein, the pyrolysis oil stream and the hydrocarbon stream are mixed in a mixing zone in the absence of a particulate cracking catalyst. The pyrolysis oil stream and the hydrocarbon stream are introduced in a substantially common direction, optionally in the presence of a carrier gas, into the mixing zone to form a mixture of the pyrolysis oil stream and the hydrocarbon stream. By introducing the pyrolysis oil stream and the hydrocarbon stream in the substantially common direction into the mixing zone, inertial flow of the mixture of the pyrolysis oil stream and the hydrocarbon stream into the reaction zone from the mixing zone minimizes contact time between the pyrolysis oil stream and the hydrocarbon stream before entry into the reaction zone to thereby minimize temperature rise of the pyrolysis oil stream from the hotter hydrocarbon stream. This additionally hinders deposit formation prior to introducing the pyrolysis oil stream into the reaction zone by minimizing contact between the mixture of the pyrolysis oil stream and the hydrocarbon stream and structures within the fuel processing apparatuses upon which deposits could otherwise form.

An exemplary embodiment of a method for preparing upgraded pyrolysis oil will now be addressed with reference to an exemplary fuel processing apparatus 10 as shown in FIG. 1. In this embodiment, the fuel processing apparatus 10 includes a pyrolysis unit 12 and a fluid catalytic cracking (FCC) unit 14. The pyrolysis unit 12 provides a pyrolysis oil stream 16 by pyrolyzing a biomass stream 18 to produce the pyrolysis oil stream 16, such as through recently-developed fast pyrolysis. Fast pyrolysis is a process during which the biomass stream 18, such as wood waste, agricultural waste, biomass that is purposely grown and harvested for energy, and the like, is rapidly heated to about 450° C. to about 600° C. in the absence of air in the pyrolysis unit 12. Under these conditions, a pyrolysis vapor stream including organic vapors, water vapor, and pyrolysis gases is produced, along with char (which includes ash and combustible hydrocarbon solids). A portion of the pyrolysis vapor stream is condensed in a condensing system within the pyrolysis unit 12 to produce the pyrolysis oil stream 16. The pyrolysis oil stream 16 is a complex, organic liquid having an oxygen content, and may also contain water. For example, the oxygen content of the pyrolysis oil stream 16 can be from about 30 to about 60 weight %, such as from about 40 to about 55 weight %, based on the total weight of the pyrolysis oil stream 16. Water can be present in the pyrolysis oil stream 16 in an amount of from about 10 to about 35 weight %, such as from about 20 to about 32 weight %, based on the total weight of the pyrolysis oil stream 16. It is to be appreciated that in other embodiments, although not shown, the pyrolysis oil stream 16 may be provided from any source of pyrolysis oil such as a vessel that contains the pyrolysis oil stream 16, and the methods described herein are not limited to providing the pyrolysis oil stream 16 from any particular source. In an embodiment, the pyrolysis oil stream 16 is provided from the pyrolysis unit 12 at a temperature of less than or equal to about 100° C., such as less than or equal to about 80° C., to minimize polymerization of the pyrolysis oil stream 16 that could lead to deposit formation after leaving the pyrolysis unit 12.

In accordance with the exemplary process contemplated herein, a hydrocarbon stream 20 is also provided. As referred to herein, "hydrocarbon stream" refers to a petroleum-based source of hydrocarbons. The hydrocarbon stream 20 is provided separate from the pyrolysis oil stream 16, with the pyrolysis oil stream 16 and hydrocarbon stream 20 later mixed in a mixing zone 22 as described in further detail below. The hydrocarbon stream 20 can include a fresh stream of hydrocarbons, or can include a refined stream of hydrocarbons from other refinement operations. In an embodiment, the hydrocarbon stream 20 is vacuum gas oil, which is a common hydrocarbon stream 20 that is upgraded in FCC units. It is to be appreciated that the hydrocarbon stream 20 may be provided from any source, and the methods described herein are not limited to providing the hydrocarbon stream 20 from any particular source. In an embodiment, the hydrocarbon stream 20 is provided at a higher temperature than the pyrolysis oil stream 16 because little risk of deposit formation from the hydrocarbon stream 20 exists due to elevated temperatures and because elevated temperatures of the hydrocarbon stream 20 promote catalytic cracking. In an embodiment, the hydrocarbon stream 20 is provided at a temperature of at least 100° C., such as from about 100 to about 425° C., for example from about 200 to about 300° C.

Figures 2, 3:
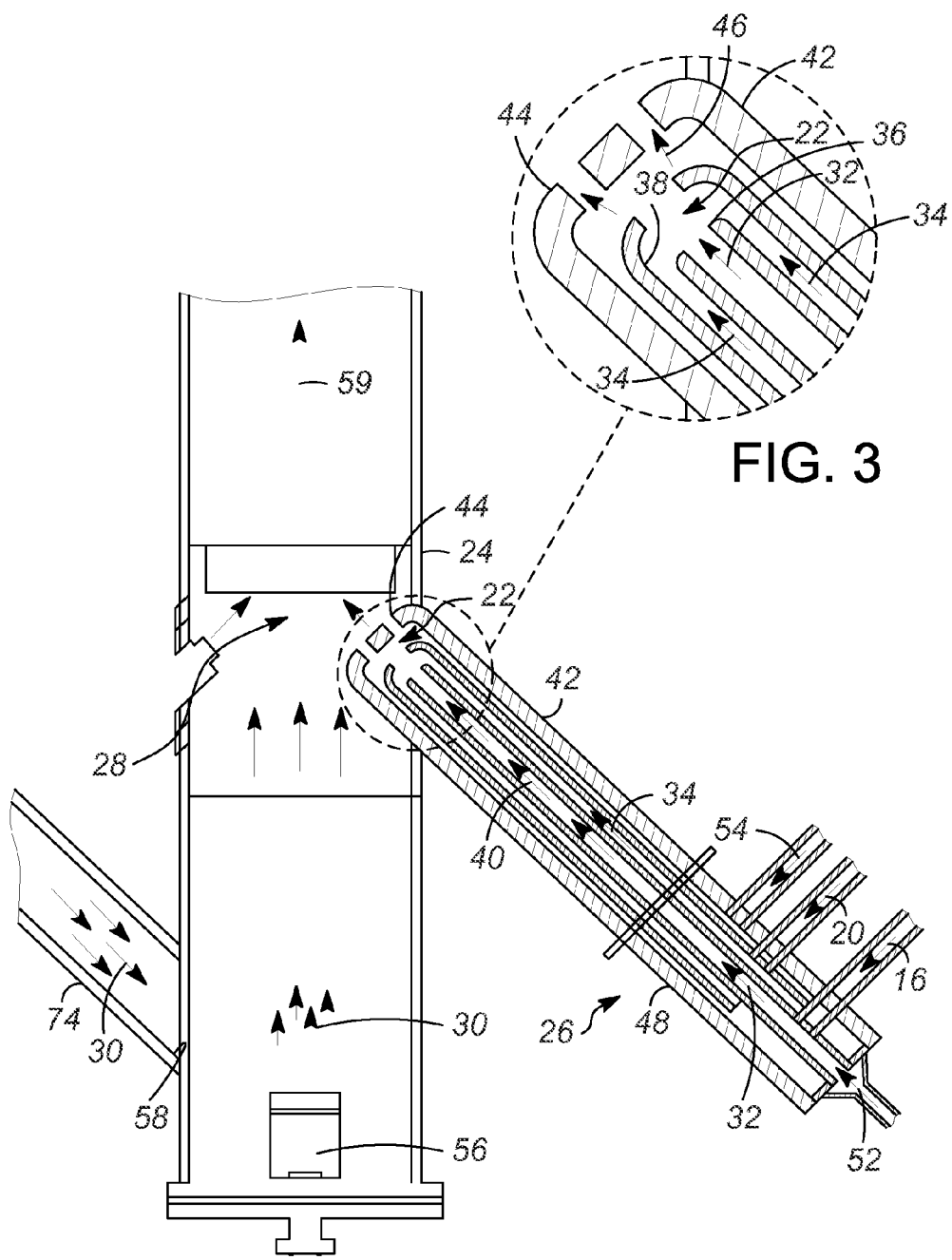
FIG. 2 is a schematic diagram of a portion of the schematic diagram of FIG. 1 showing an embodiment of a feed distributor in greater detail.
FIG. 3 is a partial schematic view of the schematic diagram of FIG. 2 shown features of the feed distributor in greater detail.

Referring to FIG. 1, an exemplary embodiment of the FCC unit 14 contemplated herein includes a reaction chamber 24 and a feed distributor 26 that is adapted to receive the pyrolysis oil stream 16 and the hydrocarbon stream 20. Referring to FIG. 2, the reaction chamber 24 has a reaction zone 28 within which a particulate cracking catalyst 30 is contacted with a mixture 46 of the hydrocarbon stream 20 and the pyrolysis oil stream 16. The feed distributor 26 is in fluid communication with the reaction chamber 24 for providing the pyrolysis oil stream 16 and the hydrocarbon stream 20 into the reaction chamber 24 and, more particularly, into the reaction zone 28. As shown in FIG. 3, the feed distributor 26 includes a pyrolysis oil feed line 32 and a hydrocarbon feed line 34 that have respective outlets 36, 38 into the mixing zone 22 for separately supporting flow of the hydrocarbon stream 20 and the pyrolysis oil stream 16 into the mixing zone 22. The exemplary method continues with providing the hydrocarbon stream 20 separate from the pyrolysis oil stream 16 to the feed distributor 26. Within the feed distributor 26, the pyrolysis oil stream 16 and the hydrocarbon stream 20 remain separated by flowing through the pyrolysis oil feed line 32 and the hydrocarbon feed line 34, respective. By separately flowing the pyrolysis oil stream 16 and the hydrocarbon stream 20 within the feed distributor 26, a temperature rise of the pyrolysis oil stream 16 can be controlled and a temperature of the pyrolysis oil stream 16 can be maintained at less than or equal to about 100° C.

In accordance with the methods contemplated herein, the pyrolysis oil stream 16 and the hydrocarbon stream 20 are introduced in a substantially common direction 40 into the mixing zone 22, as alluded to above. As referred to herein, "substantially common direction" means that both the pyrolysis oil stream 16 and the hydrocarbon stream 20 have a directional flow toward the mixing zone 22 with the individual directional flows offset by an angle of less than or equal to about 60°, such as an offset of about 0°. In an embodiment, the pyrolysis oil stream 16 and the hydrocarbon stream 20 are introduced in the same direction 40 into the mixing zone 22 with no offset angle between the individual directional flows, that is, their flows are parallel. In an exemplary embodiment of the fuel processing apparatus 10 contemplated herein, the hydrocarbon feed line 34 is concentric about the pyrolysis oil feed line 32 and the pyrolysis oil feed line 32 and the hydrocarbon feed line 34 extend in the substantially common direction 40 to the respective outlets 36, 38 into the mixing zone 22. The pyrolysis oil feed line 32 and concentrically disposed hydrocarbon feed line 34 introduce the pyrolysis oil stream 16 and the hydrocarbon stream 20, respectively, into the mixing zone 22 in the same direction 40 with no offset angle between the individual directional flows. In this regard, the pyrolysis stream and the hydrocarbon stream flow in an at least substantially coaxial manner, that is, offset by an angle of about 0°. In another embodiment, the pyrolysis oil feed line 32 and the hydrocarbon feed line 34 are at least substantially parallel to each other such that the pyrolysis stream and the hydrocarbon stream flow in an at least substantially parallel manner, that is, offset by an angle of about 0°.

The exemplary method continues with mixing the pyrolysis oil stream 16 and the hydrocarbon stream 20 in the mixing zone 22, in the absence of the particulate cracking catalyst 30, to form a mixture 46 of the pyrolysis oil stream 16 and the hydrocarbon stream 20. The mixing zone 22, as referred to herein, represents a location where the pyrolysis oil stream 16 and the hydrocarbon stream 20 are first brought into physical contact with each other. In an embodiment, the mixing zone 22 is located outside of the reaction chamber 24. For example, in an exemplary embodiment of the feed distributor 26 contemplated herein and as shown in FIGS. 2 and 3, the mixing zone 22 is located within the feed distributor 26. In this embodiment and as shown in FIG. 3, the outlets 36, 38 of the pyrolysis oil feed line 32 and the hydrocarbon feed line 34, respectively, lead into the mixing zone 22 within the feed distributor 26. Thus, the outlets 36, 38 of the pyrolysis oil feed line 32 and the hydrocarbon feed line 34 are located within the feed distributor 26, with the mixing zone 22 of the feed distributor 26 located within a nozzle 42 of the feed distributor 26. As shown in FIGS. 2 and 3, the feed distributor 26 optionally includes a spray head 44 for conveying the mixture 46 of the pyrolysis oil stream 16 and the hydrocarbon stream 20 from the mixing zone 22. In another embodiment, although not shown, the mixing zone 22 may be present within the reaction chamber 24 but outside of the reaction zone 28. For example, the particulate cracking catalyst 30 may be introduced into the reaction chamber 24 at an outlet that is downstream of the mixing zone in the reaction chamber 24, with the mixture 46 of the pyrolysis oil stream 16 and the hydrocarbon stream 20 introduced into the reaction zone 28 separate from the particulate cracking catalyst 30. In this embodiment, the outlets of the pyrolysis oil feed line 32 and the hydrocarbon feed line 34 are disposed directly within the reaction chamber 24.

In accordance with an exemplary embodiment of the method contemplated herein, the pyrolysis oil stream 16 produced from pyrolyzing the biomass stream 18 is mixed with the hydrocarbon stream 20 in the absence of intervening upgrading processing of the pyrolysis oil stream 16. Intervening upgrading processes include, but are not limited to, deoxygenation, cracking, hydrotreating, and the like. In an embodiment, the pyrolysis oil stream 16 is provided directly as a condensed product stream from the pyrolysis unit 12.

Deposit formation from the pyrolysis oil stream 16 is attributable to a temperature rise of the pyrolysis oil stream 16 above about 100° C. In an embodiment, the pyrolysis oil stream 16 is maintained at a temperature of less than or equal to about 100° C., such as less than or equal to about 80° C., up to introduction into the mixing zone 22, i.e., prior to mixing with the hydrocarbon stream 20. To minimize deposit formation from the pyrolysis oil stream 16 prior to introducing the mixture 46 of the pyrolysis oil stream 16 and the hydrocarbon stream 20 into the reaction zone 28, commingling time between the pyrolysis oil stream 16 and the hydrocarbon stream 20 prior to catalytically cracking the mixture 46 of the pyrolysis oil stream 16 and the hydrocarbon stream 20 is minimized by the aforementioned feature of the exemplary method of introducing the pyrolysis oil stream 16 and the hydrocarbon stream 20 in the substantially common direction 40 into the mixing zone 22. Minimizing the comingling time assists with minimizing temperature rise of the pyrolysis oil stream 16 prior to catalytic cracking of the mixture 46 of the pyrolysis oil stream 16 and hydrocarbon stream 20. In an embodiment, the pyrolysis oil stream 16 and the hydrocarbon stream 20 are comingled for a period of less than or equal to about 2 seconds, such as less than or equal to about 1.4 seconds, upon mixing in the mixing zone 22 before catalytically cracking the mixture 46 of the pyrolysis oil stream 16 and the hydrocarbon stream 20. Although the methods described herein are effective for minimizing deposit formation from the pyrolysis oil stream 16 prior to introducing the pyrolysis oil stream 16 into the reaction zone 28, independent of a ratio of the pyrolysis oil stream 16 to the hydrocarbon stream 20, excessive deposit formation on the particulate cracking catalyst 30 may be avoided by adjusting the ratio at which the pyrolysis oil stream 16 and the hydrocarbon stream 20 are mixed. In an embodiment, the pyrolysis oil stream 16 and the hydrocarbon stream 20 are mixed at a weight ratio of the pyrolysis oil stream 16 to the hydrocarbon stream 20 of from about 0.005:1 to about 0.2:1, such as from about 0.01:1 to about 0.05:1. Within the aforementioned weight ratios, the pyrolysis oil stream 16 is sufficiently dilute within the mixture 46 of the pyrolysis oil stream 16 and the hydrocarbon stream 20 to avoid excessive deposit formation on the particulate cracking catalyst 30, thereby avoiding impact on flow dynamics of the particulate cracking catalyst 30 within the fluid catalytic cracking unit 14, catalyst activity and selectivity, and FCC heat balance.

Referring again to FIGS. 2 and 3, the nozzle 42 of the feed distributor 26 contemplated herein houses a portion of the pyrolysis oil feed line 32 and a portion of the hydrocarbon feed line 34, and also houses the mixing zone 22 and the spray head 44. The nozzle 42 may be removable and may be attached to a main body 48 of the feed distributor 26 through a coupling ring (not shown), to thereby enable the nozzle 42 to be quickly removed for providing access to clean an interior of the feed distributor 26. Thus, in the event that deposits form in the feed distributor 26 from the pyrolysis oil stream 16, the nozzle 42 can be removed to enable the deposits to be cleaned from the feed distributor 26 or to enable a replacement nozzle 42 to be installed.

The exemplary method continues with catalytically cracking the mixture 46 of the pyrolysis oil stream 16 and the hydrocarbon stream 20 in the presence of the particulate cracking catalyst 30. In an embodiment, catalytically cracking the mixture 46 of the pyrolysis oil stream 16 and the hydrocarbon stream 20 includes comingling the particulate cracking catalyst 30 and the mixture 46 of the pyrolysis oil stream 16 and the hydrocarbon stream 20 in the reaction zone 28. Because the particulate cracking catalyst 30 is generally introduced into the reaction chamber 24 at a temperature that is sufficient to facilitate catalytic cracking of the mixture 46 of the pyrolysis oil stream 16 and the hydrocarbon stream 20, and because the hydrocarbon stream 20 is also generally provided at temperatures that facilitate catalytic cracking in the presence of the particulate cracking catalyst 30, catalytic cracking generally commences when the particulate cracking catalyst 30 is comingled with the mixture 46 of the pyrolysis oil stream 16 and the hydrocarbon stream 20. To facilitate catalytic cracking, the mixture 46 of the pyrolysis oil stream 16 and the hydrocarbon stream 20 is introduced into the reaction zone 28 within the reaction chamber 24. In an exemplary embodiment contemplated herein, the mixture 46 of the pyrolysis oil stream 16 and the hydrocarbon stream 20 is introduced from outside of the reaction chamber 24 into the reaction chamber 24. For example, the pyrolysis oil stream 16 and the hydrocarbon stream 20 are mixed in the mixing zone 22 of the feed distributor 26 as shown in FIGS. 2 and 3, and the mixture 46 of the pyrolysis oil stream 16 and the hydrocarbon stream 20 is introduced into the reaction chamber 24 from the mixing zone 22 in the feed distributor 26 that is outside of the reaction chamber 24. In particular, the mixing zone 22 is contained in the feed distributor 26, and the mixture 45 of the pyrolysis oil stream 16 and the hydrocarbon stream 20 do not enter the reaction chamber until dispensed through the spray head 44. The spray head 44 of the feed distributor 26 is disposed adjacent an inlet into the reaction chamber 24 for introducing the mixture 46 of the pyrolysis oil stream 16 and the hydrocarbon stream 20 into the reaction chamber 24. In this embodiment, the particulate cracking catalyst 30 may be introduced into the reaction chamber 24 upstream of the mixture 46 of pyrolysis oil stream 16 and the hydrocarbon stream 20 such that the particulate cracking catalyst 30 is present within the reaction chamber 24 at a location where the mixture 46 of the pyrolysis oil stream 16 and the hydrocarbon stream 20 is introduced into the reaction chamber 24. Although not shown, in other embodiments the mixing zone 22 is present within the reaction chamber 24 but outside of the reaction zone 28, and the particulate cracking catalyst 30 may be introduced into the reaction chamber 24 downstream of the mixing zone 22 in the reaction chamber 24, with the mixture 46 of the pyrolysis oil stream 16 and the hydrocarbon stream 20 introduced into the reaction zone 28 separate from the particulate cracking catalyst 30. In this embodiment, the particulate cracking catalyst 30 is not present in the mixing zone 22, but is rather introduced into the reaction chamber 24 downstream of the mixing zone 22 such that the mixing zone 22 within the reaction chamber 24 is distinct from the reaction zone 28. To inhibit deposit formation and to introduce the mixture 46 of the pyrolysis oil stream 16 and the hydrocarbon stream 20 into the reaction zone 28 in an expedient manner, the mixture 46 of the pyrolysis oil stream 16 and the hydrocarbon stream 20 may be introduced into the reaction chamber 24 in the substantially common direction 40 in which the pyrolysis oil stream 16 and the hydrocarbon stream 20 are introduced into the mixing zone 22

In an optional embodiment, to facilitate mixing of the pyrolysis oil stream 16 and the hydrocarbon stream 20 and to further facilitate introduction of the mixture 46 of the pyrolysis oil stream 16 and the hydrocarbon stream 20 into the reaction chamber 24, the exemplary method includes mixing a carrier gas 52 and the pyrolysis oil stream 16 prior to mixing the pyrolysis oil stream 16 and the hydrocarbon stream 20. The optional embodiment may further include mixing another carrier gas 54 and the hydrocarbon stream 20 concurrent with mixing the pyrolysis oil stream 16 and the hydrocarbon stream 20, and may further include mixing the particulate cracking catalyst 30 with a catalyst carrier gas 56 prior to catalytic cracking. The carrier gases 52, 54, 56 may be FCC product gas, steam, and/or an inert gas such as nitrogen, and the carrier gases 52, 54, 56 may be the same or different. The carrier gas 52 that is mixed with the pyrolysis oil stream 16 prior to mixing the pyrolysis oil stream 16 and the hydrocarbon stream 20 can also assist with maintaining the temperature of the pyrolysis oil stream 16 low to further inhibit deposit formation from the pyrolysis oil stream 16 prior to mixing with the hydrocarbon stream 20.

In an exemplary embodiment and as shown in FIG. 1, the reaction chamber 24 of the FCC unit 14 is further defined as a vertical conduit or riser 24. In this embodiment, as shown in FIG. 2, the particulate cracking catalyst 30 is introduced into the riser 24 at a catalyst inlet 58 and the mixture 46 of pyrolysis oil stream 16 and hydrocarbon stream 20 is introduced from the spray head 44 of the feed distributor 26 that is downstream of the catalyst inlet 58. The residence time of the particulate cracking catalyst 30 and the mixture 46 of the pyrolysis oil stream 16 and the hydrocarbon stream 20 in the riser 24 is generally only a few seconds. General operating conditions for the reaction zone 28 in FCC units are known in the art.

Catalytic cracking of the mixture 46 of the pyrolysis oil stream 16 and the hydrocarbon stream 20 produces an effluent 59 that includes spent particulate cracking catalyst 76 and a gaseous component 60. The gaseous component 60 includes products from the reaction in the reaction chamber 24 such as cracked hydrocarbons. In accordance with an embodiment of the contemplated method, the spent particulate cracking catalyst 76 and the gaseous component 60 are separated. In this embodiment, and as shown in FIG. 1, the FCC unit 14 further includes a separator vessel 62 that is in fluid communication with the reaction zone 28. The separator vessel 62 separates the spent particulate cracking catalyst 76 from the effluent 59. The separator vessel 62 may include a solids-vapor separation device 64, which is normally located within and at the top of the separator vessel 62. The gaseous component 60 of the effluent 59 is separated from the spent particulate cracking catalyst 76 by the separator vessel 62, and the gaseous component 60 may be vented from the separator vessel 62 via a product line 66. Although not shown, the gaseous component 60 may be compressed to obtain the upgraded fuel products, and FCC product gas that is not condensed may be recycled for use as the carrier gas 52, 54, 56 in embodiments. In an embodiment, the spent particulate cracking catalyst 76 falls downward to a stripper 68 that is located in a lower part of the separator vessel 62. The stripper 68 assists with removing deposited compounds from the spent particulate cracking catalyst 76 prior to further catalyst regeneration.

In an embodiment, the FCC unit 14 further includes a catalyst regenerator 70 that is in fluid communication with the separator vessel 62 and that is also in fluid communication with the reaction chamber 24. The spent particulate cracking catalyst 76 that is separated from the gaseous component 60 is introduced into the catalyst regenerator 70 from the stripper 68, and deposited compounds are removed from the spent particulate cracking catalyst 76 in the catalyst regenerator 70 by contacting the spent particulate cracking catalyst 76 with oxygen-containing regeneration gas. In one embodiment, the spent particulate cracking catalyst 76 is transferred to the catalyst regenerator 70 by way of a first transfer line 72 connected between the catalyst regenerator 70 and the stripper 68. Furthermore, the catalyst regenerator 70, being in fluid communication with the reaction zone 28, passes regenerated particulate catalyst 30 to the reaction zone 28. In the FCC unit 14 as illustrated in FIG. 1, the particulate cracking catalyst 30 is continuously circulated from the reaction zone 28 to the catalyst regenerator 70 and then again to the reaction zone 28, such as through a second transfer line 74.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for upgrading a pyrolysis oil stream and a hydrocarbon stream, the method comprising the steps of:
    providing the pyrolysis oil stream;
    providing the hydrocarbon stream separate from the pyrolysis oil stream;
    mixing the pyrolysis oil stream and the hydrocarbon stream in a mixing zone located adjacent a spray head of an injection nozzle and in the absence of a particulate cracking catalyst, wherein the pyrolysis oil stream and the hydrocarbon stream are introduced in a substantially common direction into the mixing zone to form a mixture of the pyrolysis oil stream and the hydrocarbon stream; and
    catalytically cracking the mixture of the pyrolysis oil stream and the hydrocarbon stream in the presence of the particulate cracking catalyst;
    wherein the pyrolysis oil stream is maintained at a temperature of less than or equal to about 80° C. up to introduction into the mixing zone; and
    wherein the pyrolysis oil stream and the hydrocarbon stream are comingled for a period of less than or equal to about 2 seconds upon mixing before catalytically cracking the mixture of the pyrolysis oil stream and the hydrocarbon stream.

2. The method of claim 1, wherein catalytically cracking the mixture of the pyrolysis oil stream and the hydrocarbon stream comprises comingling the particulate cracking catalyst and the mixture of the pyrolysis oil stream and the hydrocarbon stream in a reaction zone.

3. The method of claim 2, further comprising introducing the mixture of the pyrolysis oil stream and the hydrocarbon stream into the reaction zone in the substantially common direction in which the pyrolysis oil stream and the hydrocarbon stream are introduced into the mixing zone.

4. The method of claim 1, wherein the hydrocarbon stream is provided at a higher temperature than the pyrolysis oil stream.

5. The method of claim 1, further comprising mixing a carrier gas and the pyrolysis oil stream prior to mixing the pyrolysis oil stream and the hydrocarbon stream.

6. The method of claim 1, wherein providing the pyrolysis oil stream comprises pyrolyzing a biomass stream to produce the pyrolysis oil stream.

7. The method of claim 6, wherein the pyrolysis oil stream produced from pyrolyzing the biomass stream is mixed with the hydrocarbon stream in the absence of intervening upgrading processing of the pyrolysis oil stream.

8. The method of claim 1, wherein the pyrolysis oil stream and the hydrocarbon stream are mixed at a weight ratio of the pyrolysis oil stream to the hydrocarbon stream of from about 0.005:1 to about 0.2:1.

9. A method for upgrading a pyrolysis oil stream and a hydrocarbon stream in a fluid catalytic cracking unit including a reaction chamber and a feed distributor in fluid communication with the reaction chamber, the method comprising the steps of:

provialing the hydrocarbon stream separate from the pyrolysis oil stream to the feed distributor, wherein the feed distributor comprises a pyrolysis oil feed line and a hydrocarbon feed line having respective outlets into a mixing zone for separately supporting flow of the hydrocarbon stream and the pyrolysis oil stream into the mixing zone and wherein the pyrolysis oil feed line and the hydrocarbon feed line extend in a substantially common direction to the respective outlets;

mixing the hydrocarbon stream and the pyrolysis oil stream in the mixing zone located adjacent a spray head of an injector nozzle and in the absence of a particulate cracking catalyst to form a mixture of the pyrolysis oil stream and the hydrocarbon stream; and introducing the mixture of the pyrolysis oil stream and the hydrocarbon stream through the spray head of the injector nozzle into a reaction zone within the reaction chamber; and catalytically cracking the mixture of the pyrolysis oil stream and the hydrocarbon stream in the presence of the particulate cracking catalyst in the reaction zone within the reaction chamber;

wherein the pyrolysis oil stream is maintained at a temperature of less than or equal to about 80° C. up to introduction into the mixing zone; and wherein the pyrolysis oil stream and the hydrocarbon stream are comingled for a period of less than or equal to about 2 seconds upon mixing before catalytically cracking the mixture of the pyrolysis oil stream and the hydrocarbon stream.

10. The method of claim 9, wherein the mixture of the pyrolysis oil stream and the hydrocarbon stream are introduced into the reaction chamber in the substantially common direction in which the pyrolysis oil stream and the hydrocarbon stream are introduced into the mixing zone.

11. The method of claim 9, wherein the mixing zone is located outside of the reaction chamber, and wherein introducing the mixture of the pyrolysis oil stream and the hydrocarbon stream comprises introducing the mixture of the pyrolysis oil stream and the hydrocarbon stream from outside of the reaction chamber into the reaction chamber.

12. The method of claim 11, wherein the mixing zone is located in the feed distributor, and wherein the mixture of the pyrolysis oil stream and the hydrocarbon stream is introduced into the reaction chamber from the mixing zone in the feed distributor into the reaction chamber.

13. The method of claim 9, further comprising mixing a carrier gas and the pyrolysis oil stream in the feed distributor prior to mixing the pyrolysis oil stream and the hydrocarbon stream.

14. The method of claim 9, wherein the hydrocarbon feed line is concentric about the pyrolysis oil feed line, and wherein the pyrolysis oil stream is provided through the pyrolysis oil feed line into the mixing zone.

15. The method of claim 9, wherein the fluid catalytic cracking unit further comprises a separator vessel in fluid communication with the reaction zone, wherein catalytically cracking the mixture of the pyrolysis oil stream and the hydrocarbon stream produces an effluent comprising spent particulate cracking catalyst and a gaseous component, and wherein the gaseous component is separated from the spent particulate cracking catalyst in the separator vessel.

16. The method of claim 15, wherein the fluid catalytic cracking unit further comprises a catalyst regenerator, and wherein the particulate cracking catalyst separated from the gaseous component is introduced into the catalyst regenerator.

* * * * *